United States Patent

[11] 3,571,684

| [72] | Inventor | Mogens Ilsted Bech Birkerd, Denmark |
|---|---|---|
| [21] | Appl. No. | 849,802 |
| [22] | Filed | Aug. 12, 1969 |
| [45] | Patented | Mar. 23, 1971 |
| [73] | Assignee | Decca Limited London, England |

[54] RUDDER POSITIONING UNIT FOR THE STEERING SYSTEMS OF SHIPS
5 Claims, 5 Drawing Figs.

[52] U.S. Cl. ..................................................... 318/588, 318/615
[51] Int. Cl. ..................................... G05d 1/00, B63h 25/02
[50] Field of Search ........................................... 318/20.225, 20.420; 318/588, 615

[56] References Cited
UNITED STATES PATENTS

| 2,860,297 | 11/1958 | Bowes | 318/489X |
| 2,891,205 | 6/1959 | Freeman | 318/19 |
| 3,394,294 | 7/1968 | Leroi et al. | 318/18 |

Primary Examiner—Benjamin Dobeck
Attorney—Watson, Cole, Grindle & Watson

ABSTRACT: A rudder positioning unit for the steering systems of ships serves to position the rudder at an angle proportional to a rudder positioning signal received by the unit, and comprises a balance circuit having a balance signal output controlling start and stop of the steering gear of the ship, said balance circuit having inputs for the rudder positioning signal and for a feedback signal from a steering gear simulator, that is started and stopped simultaneously with the steering gear and is capable of simulating the movement of the steering gear, but at a smaller time lag than the latter or practically no time lag at all, preferably in the form of an electrical voltage. Means are provided for continuously effecting slow synchronization of the simulator with the steering gear, and for effecting quick synchronization on occurrence of a predetermined deviation between the simulator and the steering gear. A preferred form of a steering gear simulator is an electronic integrator circuit.

INVENTOR
Mogens Slated Bech
BY
Watson, Cole, Grindle & Watson
ATTORNEY

RUDDER POSITIONING UNIT FOR THE STEERING SYSTEMS OF SHIPS

BACKGROUND OF THE INVENTION

This invention relates to a rudder positioning unit for the steering systems of ships. By a rudder positioning unit is to be understood the part of the steering system of a ship which receives a rudder positioning signal representative of the desired rudder angle and takes care of the positioning of the rudder at that angle. The rudder positioning signal may be received directly from the rudder command signal source of the steering system, which may be a wheel for manual steering or an autopilot for automatic steering. In that case the rudder positioning signal will be identical to the rudder command signal (which may in itself be a complex signal depending both on the course deviation of the ship and its angular turning velocity). In some cases it is preferred, however, e.g. in order to compensate for poor steering properties of the ship, to provide a signal converter between the rudder command signal source and the rudder positioning unit in which case the rudder positioning signal will be different from the rudder command signal. For the purposes of the present invention, it is immaterial how the rudder positioning signal is derived, the function of the rudder positioning unit being limited to the operation of positioning the rudder at an angle which is as accurately as possible proportional to a rudder positioning signal received by the unit.

The rudder positioning unit subject of the invention is of the feedback type, i.e. the type comprising a balance circuit having inputs for a rudder positioning signal and a feedback signal, and an output for a balance signal serving as a control signal for starting the steering gear of a ship in one or the other direction and for stopping said steering gear. This type of rudder positioning unit is described e.g. in British Pat. specification No. 627,974.

In the known units of this type the feedback signal is directly dependent on the rudder position, being e.g. supplied by way of potentiometer the movable contact arm of which is connected to the rudder.

It has been found that such rudder positioning units suffer from certain drawbacks owing to the fact that the steering gear inevitably operates at a certain timelag, meaning that the steering gear takes some time to get started at full speed and to get stopped from the moment it receives the respective orders. Consequently, when the balance signal reaches the value for stop, the steering gear, and hence the rudder, will overshoot, and the feedback signal, which is directly representative of the rudder angle, will therefore also overshoot. If the overshooting of the feedback signal is so great that the balance signal reaches the value for start of the steering gear in the opposite direction, the steering gear is so started and may again overshoot to initate a second reversion etc. Such an oscillating approach to the performance of a steering order is referred to as instability of the steering function.

It will be seen that to avoid instability, the difference between the balance signals initiating stop in one direction and start in the opposite direction, the so-called dead-band width, should be selected greater than the overshoot of the steering gear, as represented by the feedback signal. On the other hand, it is desirable from the point of view of accuracy of the steering, to keep the dead-band width as small as possible. This would not in itself cause any difficulty even if the control function of the balance signal is performed by means of electromechanical relays, as is usually the case, which in themselves have a certain built-in dead-band, seeing that the dead-band width can be reduced at will by amplification of the balance signal, but as has been explained, the overshoot of the steering gear sets a lower limit to the dead-band width. Generally, this overshoot will increase with the speed of the steering gear, and consequently the greater the speed of the steering gear, the higher will be the lower limit of the dead-band width, which is unfortunate, since it is obviously desirable that the steering gear should perform steering orders as quickly as possible.

For the reasons explained, it is usually necessary to acquiesce at a compromise between dead-band width, speed of the steering gear, and stability. This compromise is not always satisfactory and particularly, in the case of automatic steering, using an autopilot as the rudder command signal source, it is not always up to the standards of precision one would expect from automatic steering.

SUMMARY OF THE INVENTION

It is the object of the invention to remedy or reduce these drawbacks. According to the invention, a rudder positioning unit of the type referred to comprises, as a source of said feedback signal, a steering gear simulator having less timelag than the steering gear, said steering gear simulator being controllable by said balance signal coincidentally with said steering gear for start in one or the other direction and for stop, thereby to produce, at a signal output thereof, a signal representative of its deviation from neutral state, the signal output of said steering gear simulator being coupled to the feedback input of said balance circuit to supply said feedback signal, means being provided for slowly synchronizing said steering gear simulator with said steering gear.

Since the only function of the steering gear simulator is to provide an electrical control signal, it may easily be constructed to operate at a very small timelag, or practically no timelag at all, and owing to its slow synchronization with the steering gear it will still be adequately representative of the rudder position. It has been found that by using such a steering gear simulator a satisfactory compromise can be obtained between dead-band width, speed of the steering gear, and stability.

When starting up the steering system, there may be a considerable discrepancy between the simulator and the steering gear, and with the slow synchronization described it may take some time before the steering is regularized. Therefore, in a preferred embodiment of the invention, the rudder positioning unit further comprises means for quick synchronization of said simulator with said steering gear upon the occurrence of a predetermined discrepancy therebetween. The quick synchronization may also be relied on in operation in the case of rapid and great changes of the rudder positioning signal, if the slope of the output signal characteristic line of the simulator is not identical to that of the output signal of the steering gear, such as will be explained below.

A particularly advantageous form of steering gear simulator is an integrator circuit. Such a circuit is capable of simulating the mechanical operation of the steering gear in a purely electrical way and therefore at practically no timelag at all. If desired, it would also be possible, however, to use an electromechanical simulator such as a small electric motor driving the movable contact arm of a potentiometer.

DESCRIPTION OF THE PREFERRED EMBODIMENTS

Figure 1A:
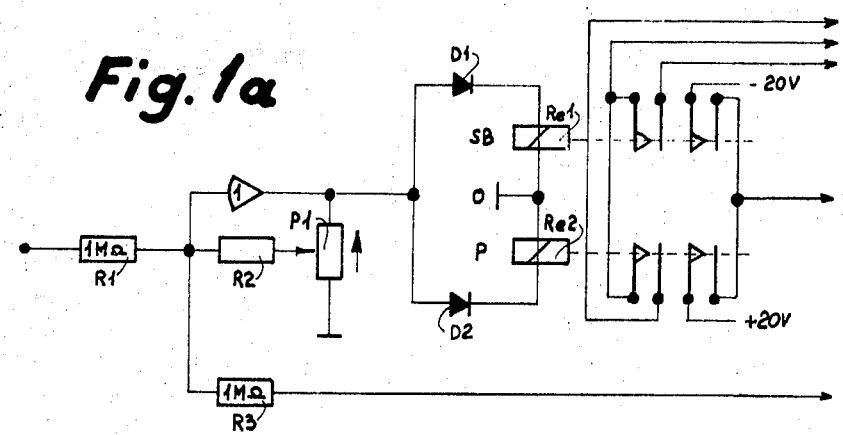
FIGS. 1a and 1b are a circuit diagram illustrating one embodiment of the invention.

The rudder positioning unit illustrated comprises a relay amplifier in the form of an operator amplifier 1. A rudder positioning signal is applied through an input resistor R 1 and is compared with a position signal of the steering gear simulator to be described below, which signal is applied through an input resistor R 3. Both signals may be expressed in terms of voltages, but seeing that they are representative of rudder angles they may alternatively be expressed in terms of degrees of angle. The difference between the two signals represents the signal referred to above as balance signal and is applied to the amplifier 1 as input signal.

The output signal of the amplifier operates a starboard relay $Re\ 1$ (also marked by the abbreviation SB) and a port relay $Re\ 2$ (also marked by the abbreviation P) through diodes D 1 and D 2. The dead-band width of the relay arrangement, as above defined, is determined by the sensitivity or amplification of the amplifier 1, which again is determined by a negative feedback resistor R 2 and by the adjustment of a potentiometer P 1.

The unit comprises a steering gear simulator constituted by an operational amplifier 2 which is coupled as an integrator circuit in combination with a capacitor C 1 and an input resistor 4. When the starboard or port relay is activated, the resistor R 4 is connected through contacts of the respective relay to the relevant one of two constant voltage sources $+20\ V$ and $-20\ V$. Alternatively separate switches, e.g. electronic switches, may be used for establishing these connections in direct response to output signal voltages of the amplifier 1 identical to those of which the relays $Re\ 1$ and $Re\ 2$ are operated.

By connection of the input resistor R 4 to the voltage $+20\ V$ or $-20\ V$, the integrator circuit will build up an output signal which will move at constant speed in positive or negative direction, simulating the movement of the steering gear, and thereby of the rudder, in the starboard or port direction. When neither of the relays $Re\ 1$ and $Re\ 2$ is operated, the output voltage of the integrator remains constant, corresponding to a stationary condition of the steering gear. The calibration of the integrator may, for example, be such that the output signal represents 0.5 V/degree with zero corresponding to center position of the rudder.

The relays $Re\ 1$ and $Re\ 2$ also have contacts which start and stop the real steering gear SG in the starboard or port direction. The steering gear again turns the rudder R in the starboard or port direction, as indicated by the arrows marked by abbreviations SB and P.

By variation of the resistor R 4 the speed of the steering gear simulator, as expressed in degrees of angle per time unit, can be adjusted in accordance with the speed, at which the rudder R is turned by the real steering gear SG.

As indicated by the dot-dash line 11 a potentiometer P 3 is mechanically connected to the rudder in such a manner that the potentiometer measures the angular position of the rudder and hence the position of the real steering gear, and transmits this position back in the form of an electric feedback signal, e.g. at a calibration value of 0.5 V/degree of angle.

The feedback signals from the steering gear simulator and from the potentiometer P 3, or in other words the angular position of the real steering gear and the equivalent angular position of the steering gear simulator are compared at the point of connection between two resistors R 6 and R 7. If a difference exists between the two feedback signals, this is applied through a resistor R 5 to the summation point of the integrator circuit and thereby causes this circuit to drift very slowly towards the position of the real steering gear so as to slowly synchronize the simulator with the steering gear.

The point of connection between the resistors R 6 and R 7 is further connected to the input of the integrator circuit by way of a potentiometer P 2 and two silicon diodes D 3 and D 4. If the difference between the positions of the steering gear and the simulator exceeds a certain value, which can be adjusted by means of the potentiometer P 2, one of the diodes D 3 and D 4 will become conductive. Thereby, owing to the relatively low values of R 6 and R 7, the integrator is quickly restored to a working point, at which the difference between the positions of the steering gear and the simulator no longer exceeds the said certain value. This is the function referred to above as quick synchronization.

In the embodiment shown the potentiometer P 2 covers a deviation between the simulator and the steering gear in the range from $\pm 2°$ to $\infty$.

Figure 1B:
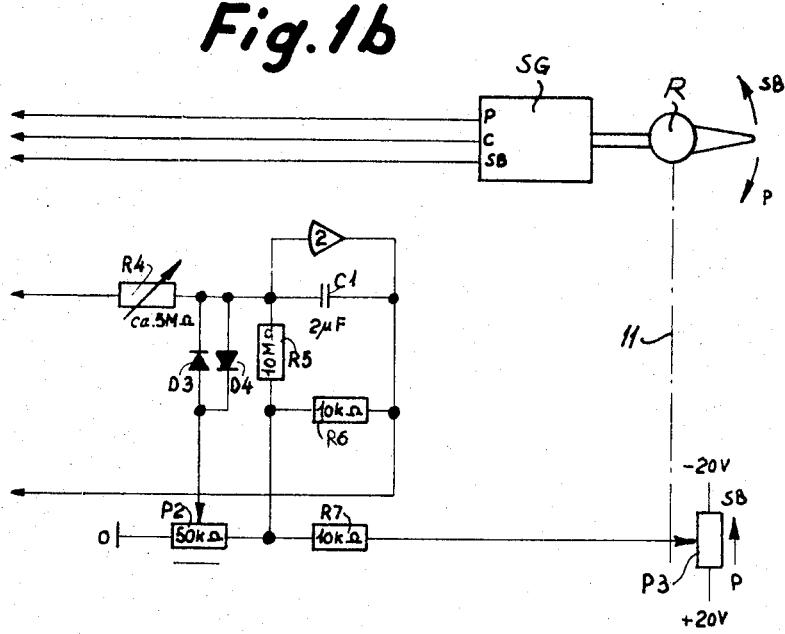

An example of the electric values of the various components is indicated in FIG. 1.

Figure 2:
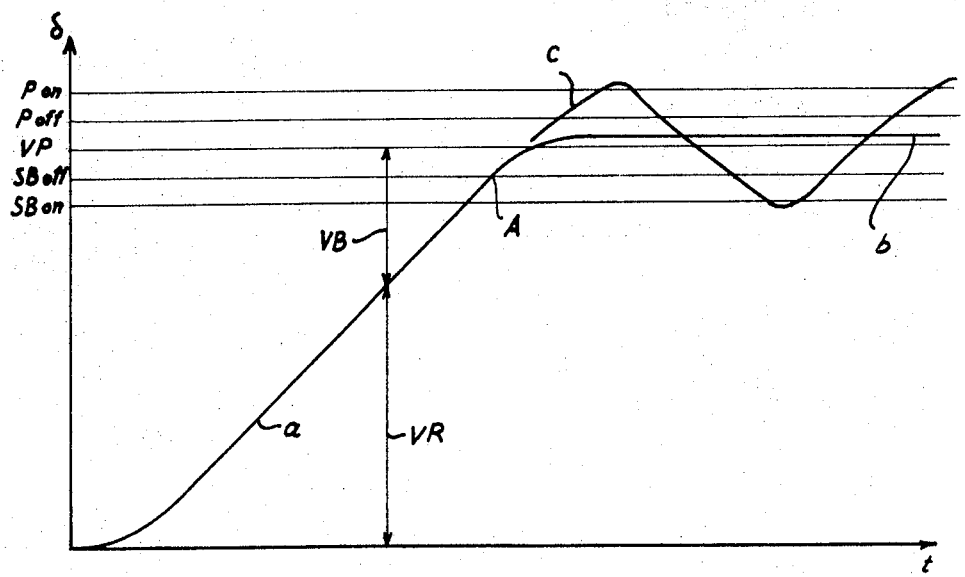
FIG. 2 is a graph illustrating the function of a conventional rudder positioning unit of the feedback type.

FIG. 2 illustrates the function of a conventional rudder positioning unit, in which a signal directly representative of the rudder position is fed back to the balance circuit. The abscissa represents time and the ordinate represents voltages or their equivalent angles in accordance with the calibration of the unit.

The graph $a$ illustrates the position of the steering gear, as expressed by the angular position of the rudder, assuming that at the time $t = 0$ the steering gear is started from central position under the influence of a rudder positioning signal VP causing the starboard relay to operate. In any point of the graph $a$, the ordinate value VR also represents the feedback signal representative of the rudder position. Thus, the distance up to the VP level line represents the balance signal $VB = VP - VR$. Consequently, the VP level line also represents the balance signal zero value, and may therefore also be referred to as the balance line. The voltages at which the starboard and port relays pull up and drop off are located on opposite sides of the balance line and are denoted by SB *on* and SB *off* for the starboard relay, and P *on* and P *off* for the port relay.

As will be seen from the graph $a$, the steering gear is started at a certain delay and then moves at a constant speed until it reaches the point A where the starboard relay drops off. The steering gear now continues to move a certain distance, or overshoots. If the overshoot is small enough to end between SB *off* and P *on*, the steering gear remains in the position it has thus assumed, see the graph portion $b$. If on the other hand, the overshoot is great enough to transgress the P *on* limit, the steering gear is started in the port direction and may again transgress the SB *on* limit to be restarted in the starboard direction, etc. as indicated by the graph portion $c$. The steering has become unstable. To avoid instability, the dead-band width between SB *off* and P *on* (or P *off* and SB *on*) must be selected greater than the overshoot.

Figure 3:
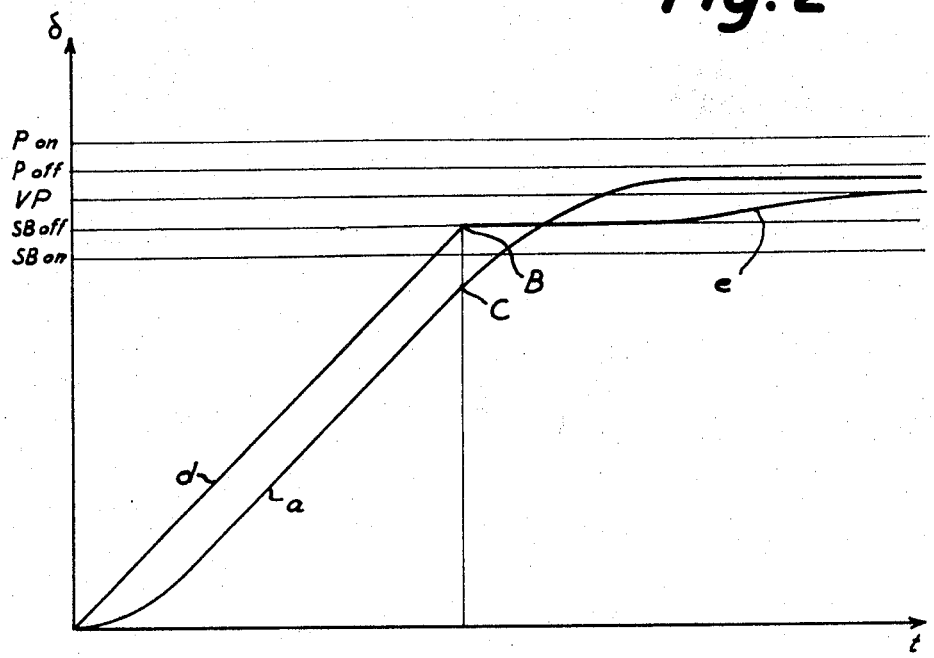
FIG. 3 is a graph illustrating the function of a rudder positioning unit according to the invention such as exemplified in FIG. 1.

In FIG. 3, the steering gear simulator of FIG. 1 has been added and is represented by the graph $d$. The starboard relay drops off where graph $d$ intersects the SB *off* line, thus at point B. At that moment the steering gear is at point C, thus considerably below the SB *off* line. Accordingly, the amount of overshoot that can be tolerated without graph $a$ transgressing the P *on* line is considerably larger than in FIG. 2. If the overshoot ends exactly at SB *off*, the simulator is still in synchronism with the steering gear. If the overshoot ends above SB *off*, slow synchronization of the simulator with the steering gear is automatically initiated, as illustrated on a compressed time scale by the graph portion $e$.

It will be realized that in FIG. 3, with a certain amount of overshoot, the dead-band width may be considerably narrowed down, as compared with FIG. 2, without causing instability, whereby more accurate steering can be obtained.

For simplification it has been disregarded in FIGS. 2 and 3 that the rudder positioning signal may have changed before balance is established. However, that would only mean that while the steering gear and the simulator are travelling up their respective graphs, the whole system of lines VP, SB *on*, Sb *off*, P *on* and P *off* will be moving up or down. Therefore, if VP is taken to represent the rudder positioning voltage not at zero time but at the time of dropoff of the starboard relay, the FIGS. will also apply in that case.

The synchronization of the simulator with the steering gear need not be completed before the next positioning operation is released by a change of the rudder positioning signal.

Figure 4:
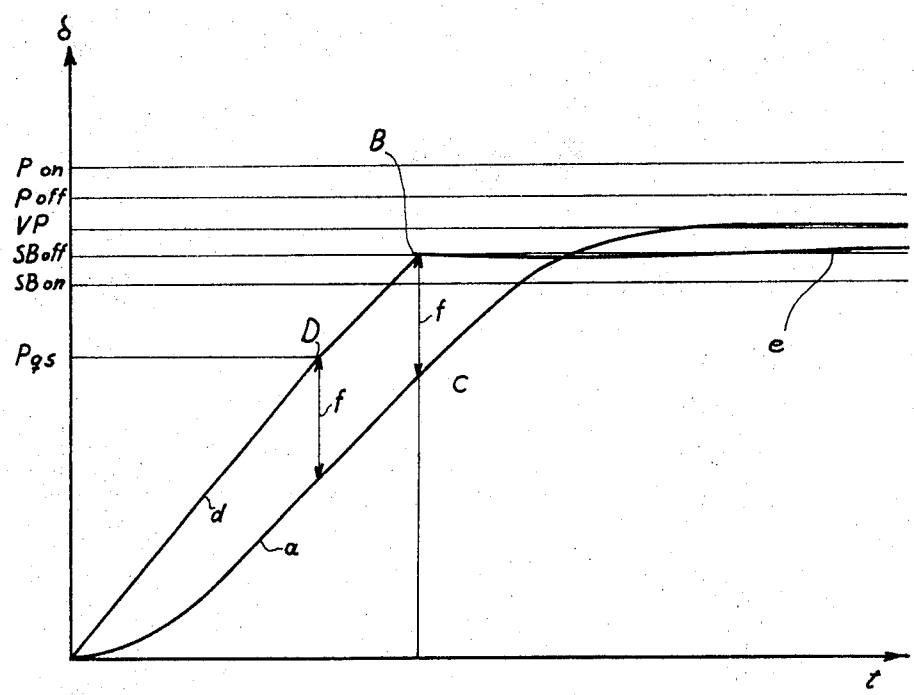
FIG. 4 is a graph similar to FIG. 3, but illustrating the function under somewhat modified conditions.

FIG. 4 illustrates the operation of the rudder positioning unit in case the steering gear simulator is adjusted so as to run at a slightly higher speed than the steering gear. In the FIG. it will be seen that the slope of graph $d$ representing the simulator is greater than that of graph $a$ representing the steering gear.

Up to point D of graph $d$ the function will be the same as previously described. At that point the deviation between the simulator and the steering gear has reached the value $f$ where the relevant one of the diodes D 3, D 4 becomes conductive to establish quick synchronization. From that point on graph $d$ will proceed parallel to graph *a* because the conductive diode will prevent the simulator from increasing its lead. At the point of intersection B between graph *d* and the SB *off* line the starboard relay drops off, and the steering gear starts overshooting from point C similarly as in FIG. 3. At the same time the slow synchronization sets in.

The value *f*, and hence the value P*qs* of the rudder positioning signal at which the quick synchronization sets in is determined by the adjustment of the potentiometer P 2. As long as the rudder positioning signal keeps below that value, the function will be the same as explained with reference to FIG 2.

In practice it has been found preferable to adjust the unit in such a manner that the quick synchronization sets in only in the case of relatively great and quick changes of the rudder positioning signal, i.e. in the case of relatively abrupt rudder commands or abrupt dislocations of the ship from a selected course, while only the slow synchronization is active as long as the steering has rather the character of a correcting function to keep the ship on a selected course under smooth steering conditions.

I claim:

1. A rudder positioning unit comprising a balance circuit having inputs for a rudder positioning signal and a feedback signal, and an output for a balance signal serving as a control signal for starting the steering gear of a ship in one or the other direction and for stopping said steering gear, characterized in that, as a source of said feedback signal, the unit comprises a steering gear position simulator having less timelag than the steering gear, said steering gear position simulator being a time integrator capable of counting forward and backward and controllable by said balance signal coincidentally with said steering gear for starting in one or the other direction and for stopping, thereby to produce, at a signal output thereof, a signal representative of the algebraic sum of the forward and backward counting periods, the signal output of said steering gear position simulator being coupled to the feedback input of said balance circuit to supply said feedback signal, means being provided for slowly synchronizing said steering gear position simulator with said steering gear.

2. A rudder positioning unit as in claim 1, and further comprising means for quick synchronization of said simulator with said steering gear upon the occurrence of a predetermined discrepancy therebetween.

3. A rudder positioning unit as in claim 1, characterized in that the steering gear simulator consists of an integrator circuit.

4. A rudder positioning unit as in claim 3, characterized in that the integrator circuit has an input connectable in response to said balance signal by way of an input resistor to sources of two different constant voltages, said input being additionally coupled by way of another input resistor to a point of comparison between the signal of the integrator circuit and a signal representative of the rudder position.

5. A rudder positioning unit as in claim 4, characterized in that a low resistance connection is provided between the input of the integrator circuit and the said point of comparison by way of a two-way threshold switch.

UNITED STATES PATENT OFFICE
CERTIFICATE OF CORRECTION

Patent No. 3,571,684　　　　　　　　　Dated March 23, 1971

Inventor(s) Mogens Ilsted Bech

It is certified that error appears in the above-identified patent and that said Letters Patent are hereby corrected as shown below:

[32]　Priority　　August 16, 1968
[33]　Denmark
[31]　3975/68

Signed and sealed this 14th day of March 1972.

(SEAL)
Attest:

EDWARD M. FLETCHER, JR.　　　　　ROBERT GOTTSCHALK
Attesting Officer　　　　　　　　　Commissioner of Patents